May 5, 1970 R. W. MICHAEL 3,510,694
VOLTAGE TO CURRENT CONVERTER
Filed March 6, 1967
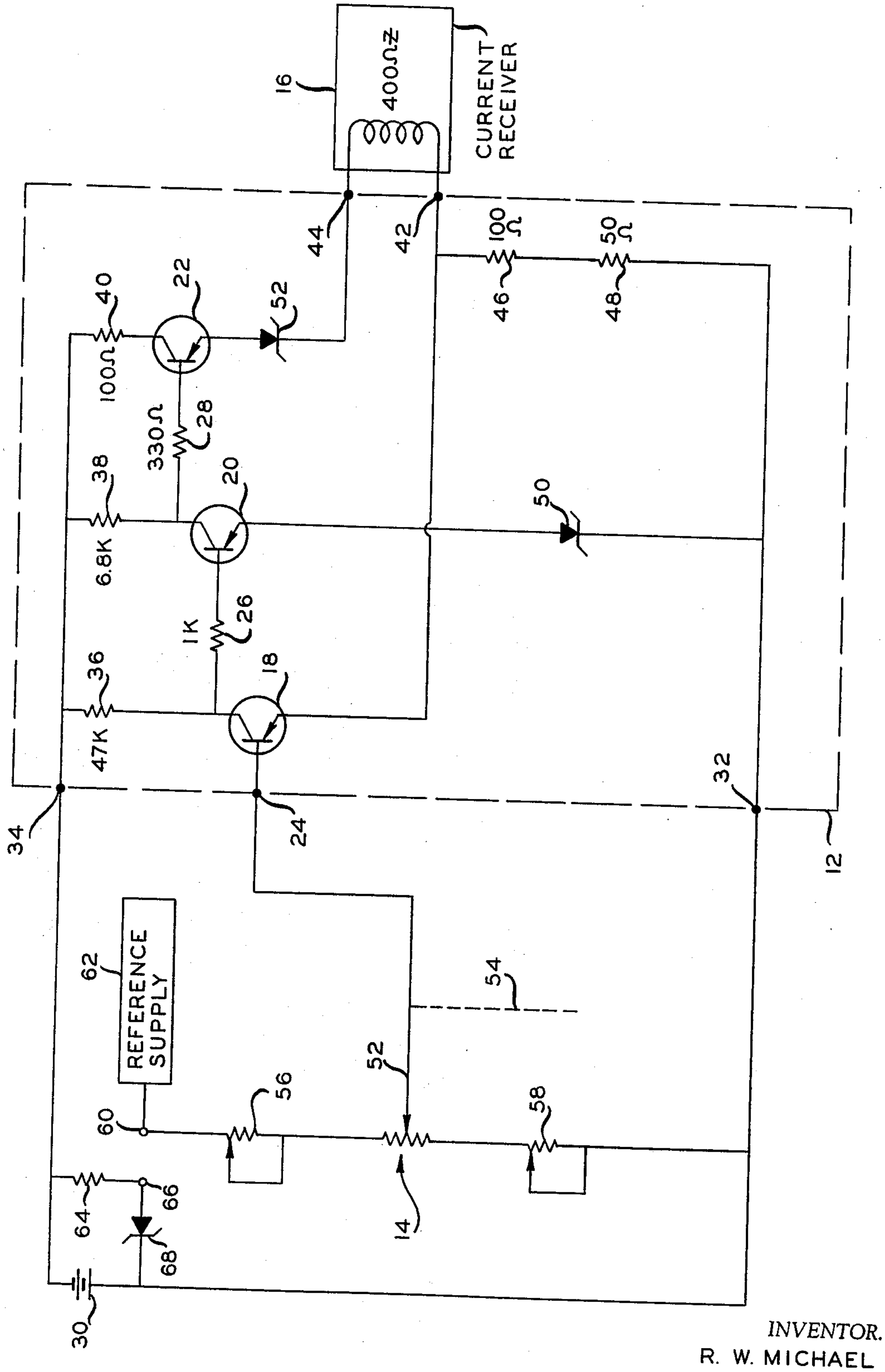
INVENTOR.
R. W. MICHAEL
BY Young & Quigg
ATTORNEYS United States Patent Office 3,510,694
Patented May 5, 1970

3,510,694

VOLTAGE TO CURRENT CONVERTER

Richard W. Michael, Bartlesville, Okla., assignor to Phillips Petroleum Company, a corporation of Delaware Filed Mar. 6, 1967, Ser. No. 620,982
Int. Cl. H03k 3/395
U.S. Cl. 307—290 5 Claims

ABSTRACT OF THE DISCLOSURE

A compact electrical circuit having a plurality of directly-coupled transistors for converting a low level, direct voltage signal to a regulated current output. The first stage transistor is connected so as to act as a comparator between the input signal and a voltage across a precision resistor. Current changes through the multiple-stage transistors compensate for current variations through the precision resistor induced by impedance variations in an external current receiver.

This invention relates to a voltage to current converter suitable for handling low level, direct voltage signals. In another aspect, this invention relates to an economical, compact voltage to current conversion electrical circuit capable of handling low level, direct voltage signals, such as those received from a telemetering potentiometer, for use in a current receiving device.

It is often desirable to provide a current output from a measurement instrument for recording or control purposes. Where the output of the existing instrument is a low, direct voltage signal, such as that from a telemetering potentiometer, this voltage must be converted to a current capable of performing the desired recording or control function. One specific example of a requirement for this voltage to current conversion is when a conventional differential refractometer is used for certain recording or control purposes. A refractometer can be used to continuously sample a process stream and analyze the composition of the stream by comparing the refractive index of the sample with a reference material. As the refractive index of the sample varies from that of the reference material, a contactor of the telemetering potentiometer is moved and an output signal, representative of the refractive index of the sample, is provided. For certain recording and operating purposes, such as the operation of a process control valve, this low, direct voltage output signal must be amplified and converted to current in order to perform the desired function.

In selecting a suitable design for an electrical circuit to perform this low voltage to current conversion, there are a number of factors which should be considered. The circuit should be capable of precise current regulation for reasonably broad impedance variations in the current receiving device. Since impedance variations may be induced by environmental temperatures, operating characteristics of the receiving device or long connecting wires, this regulation capability permits the circuit to be used in uncontrolled thermal environmental conditions and with a variety of receiving devices.

For many applications the circuit should be compact to allow for integral mounting within a measurement instrument, such as a refractometer. A compact circuit can be incorporated into the instrument without a significant increase in its overall size.

Of course, simplicity, reliability and minimum cost are always factors to be considered in the selection of a circuit design.

Various circuits have been proposed in the past to serve as voltage to current converters, each of which possess certain advantages and features, nevertheless, there has remained substantial room for improvement. One specific area for improvement is an economical, compact circuit capable of precise current regulation which can be used in conjunction with the measurement instruments. Presently only large, relatively expensive millivolt to current converters are available.

Accordingly, it is an object of this invention to provide an electrical circuit capable of converting a small, direct voltage input to a regulated current output.

Another object of this invention is to provide an economical, compact voltage to current converter which is capable of providing a precise regulated current output when used with a current receiving device having reasonably broad impedance variations.

A further object of this invention is to provide an electrical circuit for converting the small, direct voltage output from a refractometer telemetering potentiometer to a current for recording or control purposes.

Other aspects, objects and the several advantages of this invention will be readily apparent to those skilled in the art from the description, drawing and appended claims.

According to this invention, the amplification and voltage to current conversion of an input signal is accomplished by a multiple-stage amplifier circuit comprising a plurality of directly-coupled transistors. Current regulation is accomplished by arranging the first stage transistor so that it acts as a comparator between the input voltage and a voltage across a fixed, precision resistor. The input voltage, which is proportional to the desired output current, is applied to the base of the first stage transistor. The voltage from the fixed, precision resistor is applied to the emitter of the first stage transistor. The fixed, precision resistor is arranged in series with the external current receiver and the output stage transistor so that any impedance variations in the receiver result in a change in the current through the precision resistor, hence, a change in the first stage transistor emitter voltage. The emitter voltage variations result in a current change through the transistors so that the output current from the output stage transistor returns to substantially the same level as existed prior to the impedance change. Temperature compensation is provided by including a resistor having a positive temperature coefficient in series with the precision resistor.

For a better understanding of the invention, reference is made to the drawing which shows a circuit diagram exemplifying the voltage to current converter of this invention, represented by the portion of the circuit diagram enclosed by dotted line 12, connected to a potentiometer 14 and a current receiver 16.

The circuit includes three PNP transistors, 18, 20, and 22. In practice the transistors can all be standard germanium or silicon devices, transistor 18 being of the 2N522A type, transistor 20 being of the 2N1305 type and transistor 22 being of the 2N1363 type. Although three transistors are shown for purposes of illustration, additional pairs of directly-coupled transistors may be incorporated to provide additional current gain and, therefore, more accurate current regulation capability if desired.

The injut signal is introduced at terminal 24 and applied to the base of first stage transistor 18. The collector of 18 is connected through resistor 26 to the base of transistor 20. The collector of transistor 20 is connected through resistor 28 to the base of the output stage transistor 22.

The converter is energized from a suitable DC voltage source 30, such as a 21 volt DC battery or AC to DC power supply, connected to input terminals 32 and 34.

The collectors of transistors 18, 20, and 22 are each connected to the negative side of power supply terminal 34 through resistors 36, 38, and 40, respectively. The emitter of transistor 18 is connected to output terminal 42 and is also connected through precision resistor 46 and temperature compensation resistor 48 to positive power supply terminal 32. Resistor 48 has a positive temperature coefficient such as exists with a cooper or brass coil. The emitter of transistor 20 is connected through Zener diode 50 to the positive power supply terminal 32. The emitter of transistor 22 is connected through Zener diode 52 to output terminal 44.

Resistors 26 and 28 are provided for isolation and protection of the transistors but are not essential to operation. Zener diode 50, which operates as a breakdown diode, provides voltage regulation so that the desired voltage bias to the emitter of transistor 20 is maintained without passing current through precision resistor 46, i.e., the Zener diode maintains a constant voltage bias on the emitter of transistor 20 irrespective of current flow and any increased current flow is drawn by the Zener diode 50 rather than passing through the precision resistor 46. Since transistors have better linearity characteristics when operating nearer to their midrange than at their saturation voltage level, Zener diode 52 is sized to keep the voltage bias to the emitter of transistor 22 higher than the voltage bias to the emitter of transistor 20 in order that transistor 20 may always be able to cutoff transistor 22 before transistor 20 reaches saturation.

The current range of this converter can be varied by the resistance value of resistor 46. Input signals in the range of about 0.2 to 2.0 volts DC or higher can be handled with this converter. Typical milliampere current ranges that can be supplied are 0 to 4, 1 to 5, 4 to 20, and 10 to 50.

For purposes of illustration, the drawing shows the contactor 52 of a potentiometer 114 connected to signal input terminal 24, a current receiver connected to output terminals, 42 and 44, and a regulated DC power supply 30 applied across potentiometer 14 and referenced to power supply terminal 32. The arrangement shown illustrates the use of the converter of this invention in conjunction with the telemetering potentiometer for converting and regulating the millivolt output of the potentiometer to a current capable of performing the desired function of a current receiver. Potentiometer 14 represents a telemetering potentiometer of a refractometer. Current receiver 16 represents a controller, recorder, or control valve which is manipulated responsive to changes in the refractive index of the sample being analyzed by the refractometer. The drive shaft of the motor which changes the refraction of the radiation beam passing through the sample cell of a refractometer (not shown) is mechanically linked to contactors 52 through 54. Rotation of the drive shaft, representative of changes in refractive index of the sample, results in movement of contractor 52; hence, changes in the voltage level of signal to input terminal 24. The output of potentiometer through contactor 52 is proportional to the desired current output of the converter through terminal 44 to current receiver 16.

The circuit parameters shown in the drawing exemplify a voltage to current converter of this invention which will provide a current output in the range of 4 to 20 milliamperes. It should be understood that these circuit parameters are shown for the purpose of illustration only and that this invention is not limited thereto.

Variable resistors 56 and 58 are adjusted so that current receiver 16 will receive maximum current, i.e., 20 milliamperes for circuit parameters shown, and minimum current, i.e., 4 milliamperes for circuit parameters shown, when contactor 52 is at the top and bottom, respectively, of potentiometer 14 slide wire.

Potentiometer 14 is shown as receiving voltage through terminal 60 from regulated reference supply 62. Voltage to potentiometer 14 can be supplied from power supply

30 through dropping resistor 64 by connecting terminals 60 and 66, instead of using a separate reference supply 62. Zener diode 68 provides the necessary voltage regulation when power supply 30 is used to provide the voltage to potentiometer 14.

The operation of the circuitry will be explained with the arrangement shown in the drawing. If the load impedance of the current receiver 16 increases, such as may be induced by a temperature increase, the current through precision resistor 46 drops momentarily and the base of transistor 18 will become more negative with respect to its emitter, i.e., the forward bias is increased, and transistor 18 will conduct more current through its collector. The current through resistor 36 will increase thereby lowering the voltage to the base of transistor 20 through resistor 26. The lower bias to the base of transistor 20 will cause this transistor to conduct less current thereby reducing the current passing through resistor 38. The reduced voltage drop across resistor 38 will result in a higher voltage to the base of transistor 22, i.e., the forward bias is increased, and it will conduct more current through terminal 44 until the voltage drop across precision resistor 46 is increased to a level substantially the same as prior to the impedance increase in current receiver 16. A current increase through precision resistor 46 induced by an impedance decrease in the current receiver will cause transistor 18 to cutoff more because of a forward bias decrease and a current regulation, in reverse to that described previously, will result. Transistor 22 will cutoff so that the current through terminal 44 is reduced until the voltage through precision resistor 46 is lowered to a level substantially the same as prior to the impedance decrease in current receiver 16.

It will be seen from the foregoing description that the voltage to current converter of this invention involves a minimum number of inexpensive components to obtain precision current regulation with impedance variations in an external current receiver, thereby lending itself to miniaturization. Further miniaturization can be realized through the use of printed circuits. The converter can be easily assembled on a small panel for incorporation in a measurement device. If desired for any specific application, this panel can be designed as a plug-in module. For instance, if the output of a telemetering potentiometer in a refractometer can be used directly without voltage to current conversion, the panel could be removed for that application.

It should be understood that the voltage to current converter of this invention is not limited to the specific application shown in the drawing but can be used for converting any low, direct voltage signal, within practical operating limits of the transistors used, for use in a current receiver.

Reasonable variations and modifications are possible within the scope of this invention without departing from the spirit and scope thereof.

I claim:

1. A voltage-to-current conversion circuit comprising:
three direct current coupled transistors, the collector of the first being connected to the base of the second, and the collector of the second being connected to the base of the third;
a precision resistor, one end of said precision resistor being connected to the emitter of the first of said transistors;
means for applying an input voltage to be converted to the base of said first transistor;
first and second voltage input terminals;
means connecting said first voltage input terminal to the other end of said precision resistor, and means connecting said second voltage input terminal to the collectors of said three transistors;
a first Zener diode connected between the emitter of said second transistor and said first voltage input terminal;

a DC voltage source having a positive terminal and a negative terminal, said positive terminal being connected to said first voltage input terminal and said negative terminal being connected to said second voltage input terminal;

first and second current output terminals adapted to be connected to a current receiving means;

means connecting said first current output terminal to said one end of said resistor; and a second Zener diode connected between the emitter of said third transistor and said second current output terminal.

2. The circuit according to claim 1 further comprising a current receiver means connected between said first and second current output terminals.

3. The circuit according to claim 1 further comprising a resistor having a positive temperaure coefficient connected in series with said first voltage input terminal and said precision resistor

4. The circuit according to claim 1 wherein said means for applying the input voltage comprises a potentiometer having a contactor, said contactor being connected to the base of said first transistor and one end of said potentiometer being connected to said positive terminal of said DC voltage source; and a regulated DC voltage reference supply connected to the other end of said potentiometer.

5. The circuit according to claim 1 wherein said means for applying the input voltage comprises a potentiometer having a contactor, said contactor being connected to the base of said first transistor and one end of said potentiometer being connected to said positive terminal of said DC voltage source; a dropping resistor connected in series between the other end of said potentiometer and said negative terminal of said DC voltage source; and a third Zener diode connected in series between a point intermediate to said dropping resistor and said potentiometer and said positive terminal of said DC voltage source.

References Cited

UNITED STATES PATENTS

| | | | |
|---|---|---|---|
| 2,932,783 | 4/1960 | Mohler | 307—297 |
| 2,956,179 | 10/1960 | Yragui | 307—297 |
| 3,050,644 | 8/1962 | Ironside | 307—297 |
| 3,069,617 | 12/1962 | Mohler | 323—22 |
| 3,101,441 | 8/1963 | Curry | 323—22 |
| 3,125,715 | 3/1964 | Brooks | 323—22 |
| 3,317,817 | 5/1967 | Gershen | 323—4 |

JOHN S. HEYMAN, Primary Examiner

H. DIXON, Assistant Examiner

U.S. Cl. X.R.

307—270; 317—148.5